(12) United States Patent
Loustanau et al.

(10) Patent No.: US 7,647,854 B2
(45) Date of Patent: Jan. 19, 2010

(54) METHOD FOR MACHINING ELEMENTS WITH NON-CIRCULAR CROSS SECTION, IN PARTICULAR FOR AXIAL COUPLINGS FOR MECHANICAL CONNECTION, AND COUPLING MADE APPLYING SAID METHOD

(75) Inventors: Jean-Gérard Loustanau, Fondettes (FR); Marcus Caldana, Lidköping (SE)

(73) Assignees: Aktiebolaget SKF, Gothenburg (SE); Minganti International Ltd., Dublin (IE)

( * ) Notice: Subject to any disclaimer, the term of this patent is extended or adjusted under 35 U.S.C. 154(b) by 0 days.

(21) Appl. No.: 11/949,646

(22) Filed: Dec. 3, 2007

(65) Prior Publication Data
US 2008/0159808 A1    Jul. 3, 2008

Related U.S. Application Data

(62) Division of application No. 11/126,968, filed on May 11, 2005, now abandoned.

(51) Int. Cl.
*B23B 3/00* (2006.01)
*F16B 7/00* (2006.01)
(52) U.S. Cl. .................................. 82/1.11; 700/160
(58) Field of Classification Search .............. 82/1.11, 82/118, 1.3; 700/160, 163; 403/383
See application file for complete search history.

(56) References Cited

U.S. PATENT DOCUMENTS

| | | | |
|---|---|---|---|
| 3,125,838 A * | 3/1964 | Crankshaw et al. ........... 451/28 |
| 3,129,639 A * | 4/1964 | Wadleck ..................... 409/132 |
| 4,073,160 A | 2/1978 | Perret | |
| 4,934,883 A | 6/1990 | Andersson et al. | |
| 5,072,399 A * | 12/1991 | Laws et al. .................. 700/187 |
| 5,551,811 A | 9/1996 | Satran et al. | |
| 6,595,305 B1 | 7/2003 | Dunn et al. | |
| 6,619,897 B2 | 9/2003 | Erickson et al. | |
| 6,622,599 B1 * | 9/2003 | Ben-Menachem et al. .... 82/1.3 |
| 6,761,096 B1 * | 7/2004 | Kochsiek ..................... 82/1.11 |
| 7,189,039 B2 | 3/2007 | Pantzar | |
| 7,264,430 B2 * | 9/2007 | Bischof et al. .............. 409/231 |
| 2002/0020256 A1 * | 2/2002 | Mies ........................... 82/1.11 |

* cited by examiner

*Primary Examiner*—Will Fridie, Jr.
(74) *Attorney, Agent, or Firm*—Merchant & Gould P.C.

(57) ABSTRACT

Described herein is an apparatus for machining elements for axial couplings for mechanical connection, with non-circular cross section, which comprises: a work spindle (1) fitted on the shaft (103) of appropriate means (3) for actuation in rotation; a tool (7) guided by appropriate means (5, 6) in the displacements both along the axis perpendicular to that of rotation of the spindle and along the axis parallel to that of rotation of the spindle; means (105, 106) for actuation of the displacements of said tool on said guide means (5, 6); and a central control unit (4) connected to said displacement means (105, 106) of said tool and to said means for actuation in rotation (3) of said spindle (1), capable, via an appropriate program, of supervising turning of the side coupling surface of said elements for axial couplings for angular connection.

4 Claims, 3 Drawing Sheets

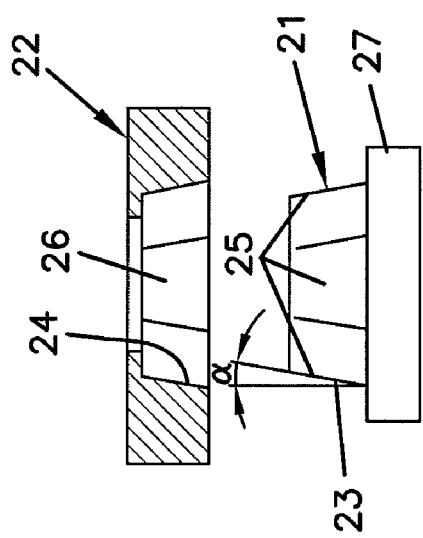
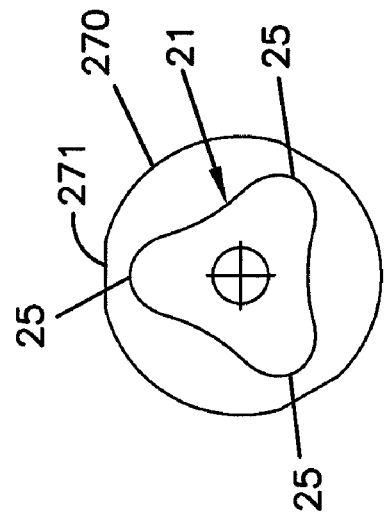
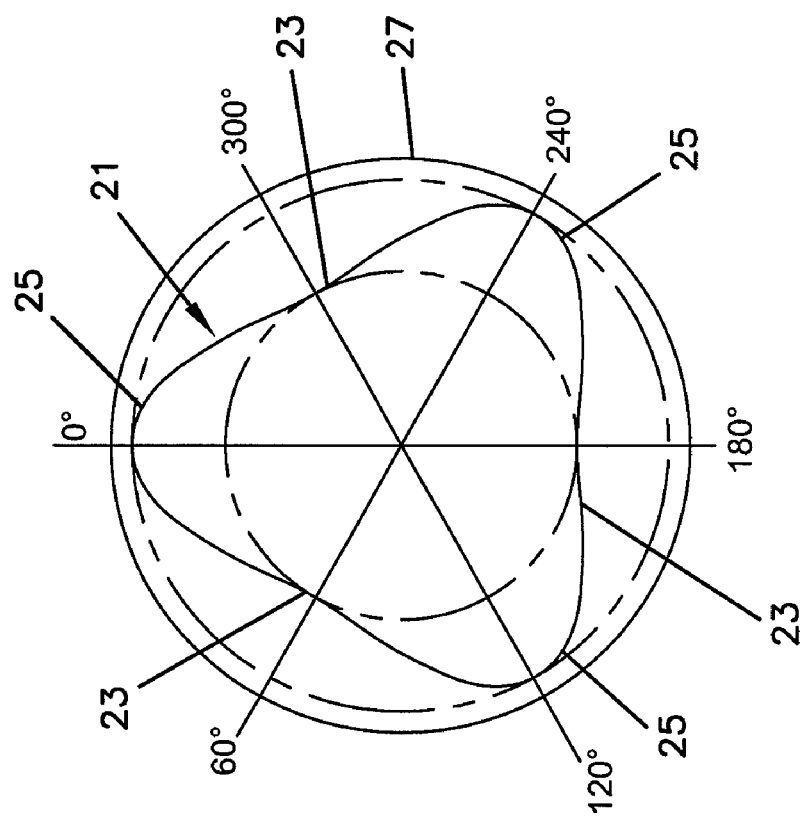

METHOD FOR MACHINING ELEMENTS WITH NON-CIRCULAR CROSS SECTION, IN PARTICULAR FOR AXIAL COUPLINGS FOR MECHANICAL CONNECTION, AND COUPLING MADE APPLYING SAID METHOD

This application is a Divisional of application Ser. No. 11/126,968, filed 11 May 2005 and which application(s) are incorporated herein by reference.

The present invention relates to lathes, and in particular to a method for turning workpieces with multilobed cross section, and an apparatus designed to implement said method. Also falling within the framework of the invention are axial couplings for mechanical connection made using said method and apparatus.

In the coaxial and angular coupling of mechanical members, in order to prevent the possibility of mutual sliding of the coupled surfaces, during transmission of the twisting moment from one surface to the other, it is known practice to form the surfaces themselves in such a way that they have a cross section other than a circular one so as to increase the reliability and the effectiveness of the coupling. This type of solution of course envisages an entire series of machining operations that enable the aforesaid characterization of the surfaces. In the majority of known methods, the two parts of the coupling are first turned and subsequently milled for providing the conditions of non-rotating coupling. This type of operation is complex, expensive in terms of time and equipment used, and increases the possibility of errors in the formation of the elements of the coupling, decreasing in effect the functional effectiveness of the coupling which is obtained.

The purpose of the present invention is hence to provide an apparatus that will enable in as simple and direct a way as possible formation of elements for axial couplings with non-circular symmetry by means of just one machining operation. A further purpose of the invention is a machining method designed to enable production of said elements.

In the research that has led to the development of the present invention, it has been found that said machining operation can be performed by turning in so far as the distance between the projecting parts and the recessed ones of the profile with non-circular symmetry is a few tenths of millimetre.

A subject of the present invention is consequently an apparatus for machining elements for axial couplings with non-circular cross section, comprising: a work spindle, fitted on the shaft of appropriate means for actuation in rotation; a tool, guided by appropriate means in the displacements both along the axis perpendicular to that of rotation of the spindle and along the axis parallel to that of rotation of the spindle; actuation means for displacements of said tool on said guide means; and a central control unit, connected to said means for displacement of said tool and to said means for actuation in rotation of said spindle, said control unit being able, via an appropriate program, to supervise turning of the side coupling surface of said elements.

A further subject of the present invention is a method for turning elements for axial couplings with non-circular cross section in an apparatus of the type described above, comprising the steps of: definition of the profile of the cross section of each of said elements on the basis of non-circular parametric curves; parametrization of the equation of the selected curve by means of the appropriate dimensional parameters of said element; processing of the datum of position of the tool for turning with respect to said element according to the angular position thereof in relation to a given cross-sectional plane; synchronization of the rotation of the spindle for supporting said element with the displacements of said tool on said plane; and further synchronization with the displacements of said tool with respect to an axis perpendicular to said plane.

The delay caused by the mechanical inertia of the machining system, which is such as to cause the hypothetical starting position of the rotation of the spindle (position zero of the spindle) to be out of phase with the machining operation carried out, is handled by an appropriate regulating subprogram in such a way that said values may coincide.

Advantageously, in order for the elements of the coupling to present conicity such as to favour their mutual coupling, for each displacement of the tool in the direction parallel to the axis of rotation of the spindle, there is performed a new processing of the datum of position of the tool for turning with respect to the new cross-sectional plane. Displacement from one cross-sectional plane to the other occurs at each complete rotation of the spindle.

The non-circular parametric curves that are used in the machining operation according to the method of the invention, are trochoidal curves, and in particular are three-lobed curves.

Further advantages and characteristics of the present invention will emerge clearly from the ensuing description of an embodiment of the apparatus and method according to the present invention, provided purely by way of non-limiting example, with reference to the attached plates of drawings, in which:

FIG. 2 is a side elevation with sectioned parts of an axial coupling, with the elements made according to the method of the present invention;

FIG. 3 is a top plan view of one of the elements illustrated in FIG. 2;

FIG. 4 shows a variant embodiment of machining of an element according to the present invention.

Figure 1:
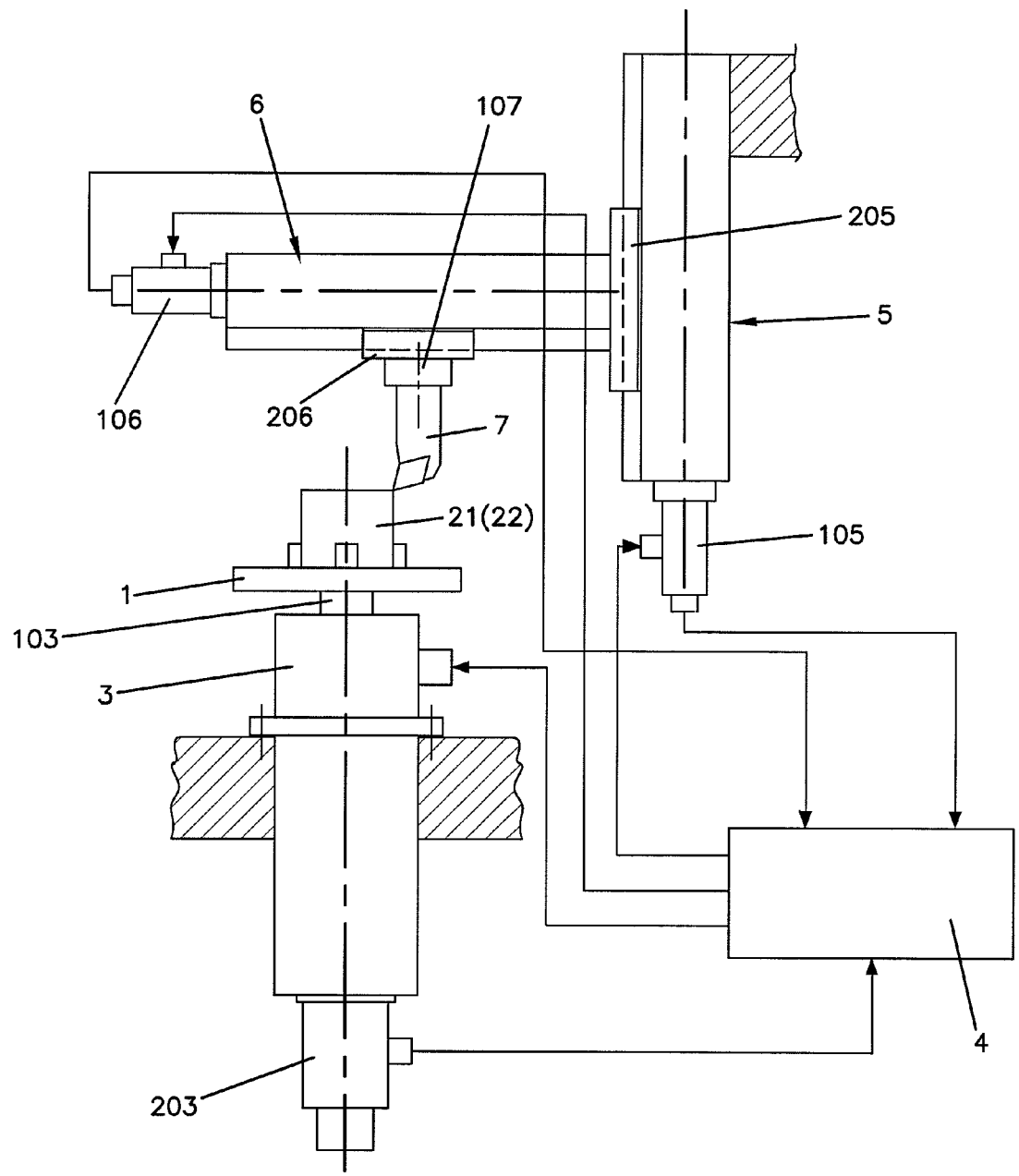
FIG. 1 is a block diagram representing the apparatus according to the present invention.

In FIG. 1, the reference number 1 designates the work spindle, on which the workpiece 21 or 22 to be machined is positioned (see below). The spindle 1 is preferably fitted on the shaft 103 of an electric motor 3, controlled by the central control unit 4, also connected to which is a precision encoder 203, which detects instant by instant, position and velocity of the shaft 103. The tool 7, set on the tool-bearing turret 107, moves in a direction perpendicular to that of the shaft 103 thanks to the actuator 106 of the slide 206, which carries said turret 107 and slides on the guide 6. The guide 6 itself is mounted on the slide 205 so that it can slide on a guide 5 that is set parallel to the shaft 103 for actuation of the spindle 3 and is mobile in said direction thanks to the actuator 105. Both the actuator 105 and the actuator 106 are governed by the central control unit 4.

FIG. 2 illustrates schematically and in a purely simplifying way an axial coupling with the angular-coupling elements made according to the method of the present invention. The male fitting 21, which is made, for example, of a single piece with a substantially circular support 27 not involved in the machining operation described herein, has its side walls inclined with respect to its vertical axis by an angle α comprised between 0° and 15°, preferably between 5° and 10°, so as to have substantially the shape of a truncated cone. The male fitting 21 presents on its external side wall 23 the formation with lobed projections 25 (FIG. 3), just as the female fitting 22 presents, on its internal side wall 24, the lobed cavities 26 complementary to the aforesaid cavities 25. The wall 24 has an inclination α complementary to the inclination of the wall 23. In FIG. 3, the male fitting 22 is represented in plan view. As may be noted, the three-lobed profile of the side wall 23 is characteristic of a parametric curve, and in particular of a trochoid. In the variant illustrated in FIG. 4, the possible support 270 is non-circular and has flattened areas 271, in positions corresponding to which there are formed the three lobes 25 of the male fitting 21.

Figure 5:
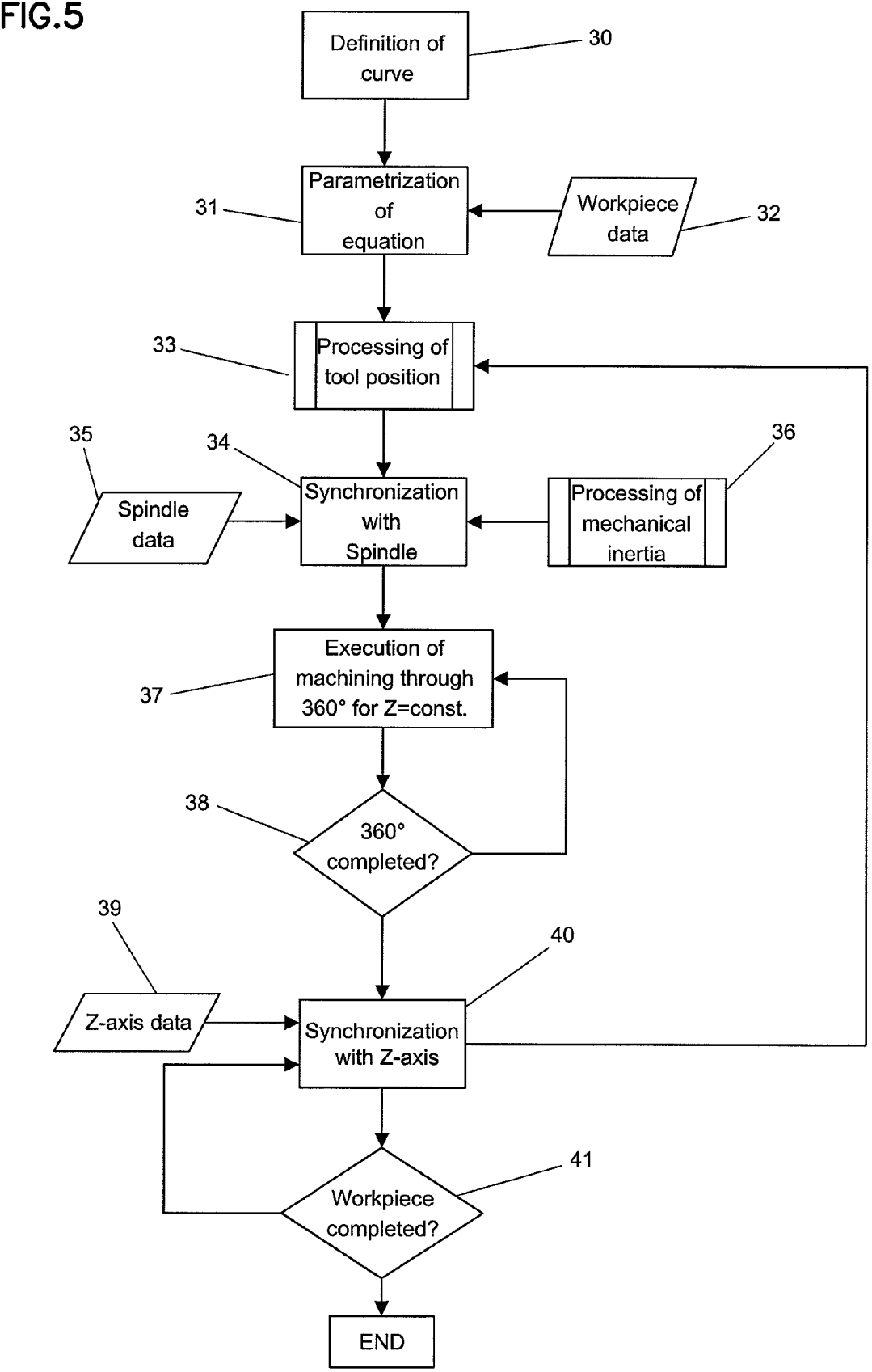
FIG. 5 is a flowchart that illustrates the program steps for implementing the method according to the present invention.

Operation of the apparatus described above will appear evident from the ensuing description of an embodiment of the method according to the present invention, with reference to the flowchart of FIG. 5, which illustrates the most important operations executed by the program loaded on the central control unit 4. Initially, as indicated by step 30, the curve that is to characterize the machining profile of the side wall of the workpiece must be defined so as to obtain the coupling element, whether it is the male fitting or the female fitting. Said curve is conveniently 5 chosen, as indicated by step 31, from amongst the set of closed parametric curves, such as, for example, trochoids, which are well suited for being used in a turning operation. A parametric curve, as its name indicates, is defined according to the parameters that characterize it; in the case in point, said parameters will be linked to the dimensional factors of the workpiece, as indicated by step 32, considered both prior to machining and in the desired appearance of the end product. Even though each curve of the aforesaid type is defined by a system of equations:

$$\begin{cases} x = f(m) \\ y = f(m) \end{cases}$$

where "m" is the parameter referred to above, in the present type of application, given that the tool is in a fixed position with respect to the work spindle, the important values of the curve are calculated substantially with respect to just one dimension. There is hence drawn up, following upon parametrization of the equation, a table containing the datum of position of the tool with respect to the variation of the angular position of the spindle, as indicated by step 33.

Purely by way of non-limiting example, provided in what follows is a table useful for the aforesaid purpose, where "c" designates the angular position of the spindle, and "x2" the multiplying coefficient corresponding to the position of the tool.

| c 0° | x2 = 1.00035, | c 5° | x2 = 0.99812, |
|---|---|---|---|
| c 10° | x2 = 0.99601, | c 15° | x2 = 0.99404, |
| c 20° | x2 = 0.99224, | c 25° | x2 = 0.99061, |
| c 30° | x2 = 0.98917, | c 35° | x2 = 0.98793, |
| c 40° | x2 = 0.9869, | c 45° | x2 = 0.98609, |
| c 50° | x2 = 0.98551, | c 55° | x2 = 0.98515, |
| c 60° | x2 = 0.98504, | c 65° | x2 = 0.98515, |
| c 70° | x2 = 0.9855, | c 75° | x2 = 0.98609, |
| c 80° | x2 = 0.9869, | c 85° | x2 = 0.98792, |
| c 90° | x2 = 0.98916, | c 95° | x2 = 0.9906, |
| c 100° | x2 = 0.99223, | c 105° | x2 = 0.99403, |
| c 110° | x2 = 0.996, | c 115° | x2 = 0.99811, |
| c 120° | x2 = 1.00035, | c 125° | x2 = 0.99812, |
| c 130° | x2 = 0.99598, | c 135° | x2 = 0.99401, |
| c 140° | x2 = 0.99221, | c 145° | x2 = 0.99058, |
| c 150° | x2 = 0.98913, | c 155° | x2 = 0.98789, |
| c 160° | x2 = 0.98686, | c 165° | x2 = 0.98605, |
| c 170° | x2 = 0.98547, | c 175° | x2 = 0.98512, |
| c 180° | x2 = 0.98504, | c 185° | x2 = 0.98512, |
| c 195° | x2 = 0.98605, | c 200° | x2 = 0.98686, |
| c 205° | x2 = 0.98789, | c 210° | x2 = 0.98913, |

-continued

| c 215° | x2 = 0.99058, | c 220° | x2 = 0.99221, |
|---|---|---|---|
| c 225° | x2 = 0.99401, | c 230° | x2 = 0.99598, |
| c 235° | x2 = 0.9981, | c 240° | x2 = 1.00035, |
| c 245° | x2 = 0.99811, | c 250° | x2 = 0.996, |
| c 255° | x2 = 0.99403, | c 260° | x2 = 0.99223, |
| c 265° | x2 = 0.9906, | c 270° | x2 = 0.98916, |
| c 275° | x2 = 0.98792, | c 280° | x2 = 0.9869, |
| c 285° | x2 = 0.98609, | c 290° | x2 = 0.9855, |
| c 295° | x2 = 0.98515, | c 300° | x2 = 0.98504, |
| c 305° | x2 = 0.98515, | c 310° | x2 = 0.98551, |
| c 315° | x2 = 0.98609, | c 320° | x2 = 0.9869, |
| c 325° | x2 = 0.98793, | c 330° | x2 = 0.98917, |
| c 335° | x2 = 0.99061, | c 340° | x2 = 0.99224, |
| c 345° | x2 = 0.99404, | c 350° | x2 = 0.99601, |
| c 355° | x2 = 0.99812, | c 360° | x2 = 1.00035. |

In the next step 34, the datum corresponding to the position of the tool is appropriately synchronized with the current position and the angular velocity of the spindle, as designated by step 35, said data being both detected by the encoder 203 of FIG. 1. Together with this operation, as indicated by step 36, a correction is performed via an appropriate subprogram, which enables compensation of the mechanical inertia of the various components of the machining system as shown in FIG. 1. This type of compensation proves fundamental in the case where there are used, as illustrated for example in FIG. 4, the non-circular outer parts of the male piece (or female piece), since an unbalancing between the formation of the lobes and the machining operations present on said outer parts would induce troublesome dynamic oscillations when the workpiece is set in rotation.

Machining is at this point carried out on the side surface of the workpiece, with respect to a position substantially fixed along the axis of vertical displacement Z of the tool, as indicated by step 37. When the machining is completed on all the side wall of the workpiece, as indicated by step 38, the data corresponding to the height of the workpiece and to its conicity are inserted in the program, as indicated by step 39, and, according to these data, the values corresponding to the position of the tool are recalculated, as indicated by step 40. At the end of each turn of machining, this control is carried out until the information indicates that machining on the workpiece is completed, as indicated by step 41.

In FIG. 3, the depth of the depressions comprised between the lobes has been purposely exaggerated for greater clarity of exposition. The peak-trough distance in the profile of a curve of the type used according to the present invention is in general less than 1000 μm, preferably is comprised between 100 μm and 500 μm and, on average, is in the region of 200 μm.

The elements for axial couplings with non-circular cross section, obtained with the apparatus and via the method according to the present invention, are hence made in a decidedly simpler, more rapid and precise way with respect to what is known to the art, in so far as the machining carried out in just one passage guarantees a greater accuracy of execution, a smaller expenditure in terms of time, and is carried out with the aid of a machine that does not depart much, except above all as regards the way in which it is used, from an ordinary lathe.

It is understood that the description refers to a preferred embodiment of the invention, to which numerous constructional variations and modifications may be made, without thereby, however, departing from the informative principle of the invention, as set forth above, illustrated, and claimed in what follows. In the claims, the reference numbers appearing in brackets are provided purely by way of non-limiting indication in regard to the sphere of protection of the claims.

The invention claimed is:

1. A method for the turning of elements for axial couplings with non-circular cross section in an apparatus for machining elements for axial couplings for mechanical connections, with non-circular cross section, comprising: a work spindle having a rotational axis and fitted on the shaft of a rotation actuator; a tool engaging a guide both along an axis perpendicular to the rotational axis of the spindle and along an axis parallel to the rotational axis of the spindle; a sliding actuator for displacement of said tool on said guide; and a central control unit connected to said sliding actuator of said tool and to rotation actuator of said spindle, and a program, supervising turning of a side coupling surface of said elements for axial coupling for angular connection; the method comprising the steps of:

defining a cross section profile of each of said elements, on the basis of non-circular parametric trochoidal three-lobed curves;

parameterizing the equation of the selected non-circular parametric trochoidal three-lobed curve, by dimensional parameters of said element;

processing position data of the tool for turning with respect to said element according to an angular position of the tool, in relation to a given cross-sectional plane;

synchronizing rotation of the spindle for supporting said element with the displacements of said tool on said plane; and further synchronizing the displacements of said tool with respect to an axis perpendicular to said plane.

2. The method according to claim 1, wherein, simultaneously with the step of synchronization of rotation of the supporting spindle with the displacements of said tool on said cross-sectional plane, the data appropriately acquired corresponding to the angular position and to the angular velocity of said spindle are processed.

3. The method according to claim 1 wherein, simultaneously with the step of synchronization of the rotation of the supporting spindle with the displacements of said tool on said cross-sectional plane, the mechanical inertia of the actuation means used is compensated.

4. The method according to claim 1, wherein, simultaneously with the step of synchronization of the displacements of said tool with respect to an axis perpendicular to said cross-sectional plane, for each displacement of the tool in the direction perpendicular to the axis of rotation, a new processing of the datum of position of the tool for turning with respect to the new cross-sectional plane is executed, the displacement from one cross-sectional plane to the other being performed at each complete rotation of the spindle.

* * * * *